UNITED STATES PATENT OFFICE

2,453,824

ALPHA-ACETOXYMETHYL ACRYLONITRILE POLYMERS

Thomas F. Wood, Clifton, N. J., assignor to United States Rubber Company, New York, N. Y., a corporation of New Jersey No Drawing. Application April 9, 1946, Serial No. 660,864

3 Claims. (Cl. 260—83)

This invention relates to a new composition of matter which is referred to as alpha-acetoxymethyl acrylonitrile (or beta-cyanoallyl acetate). Analyses indicate that this chemical has the formula

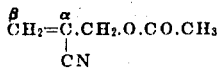

The new compound is a colorless liquid of the following properties: B. Pt.=38–40° C. at 1 mm., $d_4^{20}$=1.048, $N_D^{20}$=1.4415, $M_d$ ref.=31.42 (Calc.=31.18), per cent N=11.13 (Calc.=11.18%). The pure compound will polymerize upon standing at room temperature and is best kept in a cold refrigerator unless a polymerization inhibitor is added to it.

A method of preparing this compound involves the following steps: (1) reaction of acetonyl acetate (acetoxy-propanone) with hydrogen cyanide to yield the cyanohydrin in nearly quantitative yield; (2) acetylation of the cyanohydrin by means of acetic anhydride and sulfuric acid catalyst to give alpha-beta-diacetoxyisobutyronitrile in 85–90% yield; and (3) pyrolysis of alpha-beta-diacetoxyisobutyronitrile at 430–450° C. to yield mainly acetic acid and alpha-acetoxy-acrylonitrile in about 70% yield. The reactions may be represented as follows:

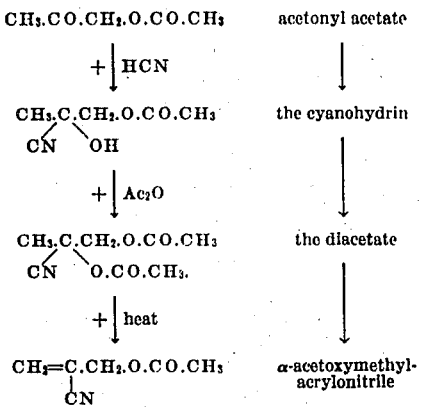

The following examples illustrate a preferred method, in detail, of preparing the new compound:

EXAMPLE 1

(a) α,β-Diacetoxyisobutyronitrile

Into a 3-liter, round bottom flask, provided with a stirrer, feed funnel, and reflux condenser and cooled in an ice-bath, are placed 6 gms. of KCN and 600 cc. of liquid HCN. Then there are gradually dropped in 758 gms. (6.53 moles) of acetonyl acetate with stirring. The mixture is stirred, with external ice cooling, for 3 hours and then allowed to stand overnight packed in Dry Ice. On the following morning the mixture is acidified with 9 cc. of 50% sulfuric acid and the excess HCN removed under reduced pressure (20″ Hg). The crude cyanohydrin is acetylated directly, as follows:

Into a 3-liter, 3-neck, round bottom flask provided with a stirrer, reflux condenser, feed funnel, and thermometer are placed 900 gms. (8.8 moles) of technical acetic anhydride and 1.7 cc. of 95% $H_2SO_4$. The solution is warmed to 70° C. and there is run in with stirring the crude cyanohydrin (6.6 moles approx.) of acetoxypropanone. The temperature rises to 94° C. and about 30 minutes is taken for the addition. The mixture is then kept at 90° C. for 2 hours. After being cooled to room temperature, the solution is filtered to remove inorganic salt ($Na_2SO_4$), and is vacuum-distilled. The total yield of water-white product is 1050 gms. (85.5% of theory). The properties of this new compound are: B. Pt.=80–81° C./1 mm., 98° C./3 mm.; $d_4^{20}$=1.1260; $N_D^{20}$=1.4294; $M_d$ ref.=41.65 (Calc.=42.18); per cent N=7.55 (theory=7.57%).

(b) α-Acetoxymethyl acrylonitrile

A suitably provisioned pyrolysis pyrex tube is provided with an inlet for feeding thereinto nitrogen gas, and is also connected to a receiver flask which is adapted to be cooled with ice water. The receiver is provided with a Dry-Ice trap, which in turn is further connected to an absorbing tower packed with activated charcoal and KOH pellets, in order to absorb any HCN which might pass through the Dry-Ice trap.

The pyrolysis tube is heated, by suitable means, to 440° C., and after thorough flushing with nitrogen, 700 gms. of alpha,beta-diacetoxyisobutyronitrile are dropped into the tube through a feed funnel at a rate of about 3 or 4 cc. per minute with a small stream of the nitrogen gas flowing through the apparatus. About 2¾ hours are taken to feed the diacetoxyisobutyronitrile through the tube. There are obtained 674.4 gms. of liquid condensate in the receiver. This material is vaccum-fractionated. There are obtained (1) 219 gms. of acetic acid boiling at from 39° C. to 50° C. at 50 mm.; (2) an intermediate cut boiling from 50° C. at 50 mm. to 37.2° C. at 0.8 mm.; (3) 291 gms. of water-white product boiling at 38–39° C. 1 mm., having a refractive index=1.4410 to 1.4421 at 20° C. (4) Two higher fractions, amounting to 96 gms. are unconverted diacetoxyisobutyronitrile. The yield of product (fraction 3) boiling at 38–40° C. 1 mm. is 70.5% of theory based on the intermediate.

After redistillation, the product has the following properties: B. Pt.=39° C. at 1 mm.; $d_4^{20}$=1.048; $N_D^{20}$=1.4415; $M_D$ ref.=31.42 (Calc.=31.18); per cent N=11.13 (theory=11.18%).

The product has been discovered to be an exceedingly active monomer suitable for polymerizing or copolymerizing to give hitherto unknown polymers and copolymers usable in the art of making plastic materials.

EXAMPLE 2

A 3 cc. portion of fraction 3 above is heated with about ½% of benzoyl peroxide in a sealed tube at 60° C. for 45 hours. At the end of this time the material polymerizes to form a clear polymer. This polymer is slightly yellow in color, is somewhat flexible, and is soft enough to be creased by the fingernail.

Further illustrations of polymerization and copolymerization of alpha-acetoxymethyl acrylonitrile are as follows:

The following polymerization experiments were made in small sealed tubes:

A

α-Acetoxymethyl acrylonitrile_____ 5 gms. (0.04 mol)
Methyl acrylate_____ 3.44 gms. (0.04 mol)
Benzoyl peroxide_____ 0.0422 g. (0.5%)

B

α-Acetoxymethyl acrylonitrile_____ 5 gms. (0.04 mol)
Styrene _____ 4.16 gms. (0.04 mol)
Benzoyl peroxide_____ 0.046 (0.5%)

C

α-Acetoxymethyl acrylonitrile_ 0.05 gms. (0.5%)
Benzoyl peroxide_____ 10 gms.

The tubes are heated for a period of 72 hours at 60° C. At the end of this time the contents of each of the tubes have solidified to clear resins. The product in Tube A is a clear, colorless, slightly flexible rod. The contents of tube B is likewise colorless but is extremely hard and somewhat brittle indicating that copolymerization has occurred to a rather high degree. The fact that these polymerizates are clear and transparent and not opaque is considered good evidence of copolymerization. The homopolymer of alpha-acetoxymethyl acrylonitrile is light yellow in color, somewhat flexible, and soft enough to be creased by the fingernail. All of these three resinous materials are quite soluble in acetone and are purified by two successive precipitations from acetone into a petroleum naphtha and vacuum drying. After purification, sample A amounts to 7.2 gms.; B, 8.9 gms.; C, 7.8 gms. The samples are finely ground in a Wiley mill and again vacuum-dried. Analyses of these samples are as follows:

| | Per cent C | Per cent H | Per cent N | $[\eta]$ in acetone |
|---|---|---|---|---|
| A | 56.78 | 6.39 | 5.90 | 0.301 |
|   | 56.88 | 6.29 | 5.90 | 0.309 |
| B | 75.48 | 6.86 | 5.26 | 0.621 |
|   | 75.46 | 6.78 | 5.18 | 0.613 |
| C |       |      | 10.65 | 0.242 |
|   |       |      | 10.76 | 0.253 |

In sample A the per cent carbon indicates that 0.573 mol of alpha-acetoxymethyl acrylonitrile is combined with 0.427 mol of methyl acrylate; calculation from percent nitrogen indicates 0.527 mol of alpha-acetoxymethyl acrylonitrile in the copolymer. In sample B the per cent carbon indicates that the copolymer consists of 0.523 mol of alpha-acetoxymethyl acrylonitrile and 0.477 mol of styrene. It is thus indicated that the product is approximately a 1:1 copolymer. The copolymer with methyl acrylate (A) has a softening range of from 70–80° C., becoming quite fluid at 150° C. It can readily be molded. The copolymer with styrene has a softening range of from 80–90° C. The homopolymer of alpha-acetoxymethyl acrylonitrile softens at from 100–120° C. and becomes tacky with discoloration at higher temperatures.

The new monomer of the invention may also be used as an intermediate for the preparation of new chemical derivatives by Michael condensations catalyzed by bases, and furthermore, may be used for the preparation of alpha-acetoxymethyl acrylic acid and its esters.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. Alpha-acetoxymethyl acrylonitrile.
2. A polymeric mass comprising a polymerized alpha-acetoxymethyl acrylonitrile.
3. A polymerizate comprising alpha-acetoxymethyl acrylonitrile interpolymerized in a molecular proportion of approximately one-to-one with a different polymerizable monomer selected from the class consisting of methyl acrylate and styrene.

THOMAS F. WOOD.

REFERENCES CITED

The following references are of record in the file of this patent:

UNITED STATES PATENTS

| Number | Name | Date |
|---|---|---|
| 2,266,771 | Lange et al. | Dec. 23, 1941 |
| 2,326,373 | Long | Aug. 10, 1943 |
| 2,385,258 | Clifford | Sept. 18, 1945 |

Certificate of Correction

Patent No. 2,453,824.  November 16, 1948.

THOMAS F. WOOD

It is hereby certified that errors appear in the printed specification of the above numbered patent requiring correction as follows:

Column 2, line 31, after the word "provisioned" insert *vertical*; line 50, for "vaccum" read *vacuum*; column 3, line 43, for "α-Acetoxymethyl acrylonitrile__0.05 gms. (0.5%)"

read

*α-Acetoxymethyl acrylonitrile__10 gms.* line 44, for "Benzoyl peroxide__10 gms." read *Benzoyl peroxide__0.05 gms. (0.5%)*;

and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*